US010344786B2

(12) United States Patent
Jodeleit et al.

(10) Patent No.: US 10,344,786 B2
(45) Date of Patent: Jul. 9, 2019

(54) QUICK FASTENER, METHOD FOR CONNECTING TWO COMPONENTS BY MEANS OF THE QUICK FASTENER AND PRODUCTION METHOD THEREFOR

(71) Applicant: Böllhoff Verbindungstechnik GmbH, Bielefeld (DE)

(72) Inventors: Martin Jodeleit, Bielefeld (DE); Hans-Joachim Dembowsky, Hamburg (DE); Jörg Matthes, Herford (DE); André Janßen, Isenbüttel (DE); Torsten Hübner, Wolfsburg (DE)

(73) Assignee: Böllhoff Verbindungstechnik GmbH (DE)

( * ) Notice: Subject to any disclaimer, the term of this patent is extended or adjusted under 35 U.S.C. 154(b) by 124 days.

(21) Appl. No.: 15/520,529

(22) PCT Filed: Sep. 22, 2015

(86) PCT No.: PCT/EP2015/071787
§ 371 (c)(1),
(2) Date: Apr. 20, 2017

(87) PCT Pub. No.: WO2016/062488
PCT Pub. Date: Apr. 28, 2016

(65) Prior Publication Data
US 2017/0314592 A1     Nov. 2, 2017

(30) Foreign Application Priority Data

Oct. 20, 2014   (DE) .................. 10 2014 221 266

(51) Int. Cl.
*F16B 5/02*        (2006.01)
*F16B 21/04*      (2006.01)
*F16B 31/04*      (2006.01)

(52) U.S. Cl.
CPC .......... *F16B 5/0208* (2013.01); *F16B 5/0233* (2013.01); *F16B 5/0266* (2013.01); *F16B 21/04* (2013.01); *F16B 31/04* (2013.01)

(58) Field of Classification Search
CPC ......... F16B 21/02; F16B 5/0208; F16B 31/04
(Continued)

(56) References Cited

U.S. PATENT DOCUMENTS

| 689,036 A | * | 12/1901 | Buell | ...................... F16B 39/32 |
| | | | | 30/270 |
| 1,278,538 A | * | 9/1918 | Weston | ................... F16B 31/04 |
| | | | | 411/350 |

(Continued)

FOREIGN PATENT DOCUMENTS

| CN | 1169769 A | 1/1998 |
| CN | 1386172 A | 12/2002 |

(Continued)

OTHER PUBLICATIONS

Japanese Office Action for JP 2017-521229; dated Jun. 12, 2018; 11 pages.

(Continued)

*Primary Examiner* — Flemming Saether
(74) *Attorney, Agent, or Firm* — Barclay Damon, LLP

(57) ABSTRACT

A quick fastener by means of which at least a first and a second component are connectable to each other. The quick fastener includes a fastening bolt having a fastening thread of a first spiral direction, which is fastenable at the second component, and a compressible pretension element which is fastenable at the first component. The compressible pretension element includes a pretension thread at a radial inner side having a second spiral direction opposite to the first spiral direction, a hollow cylindrical thread element which is screwable with an outer thread at a radial outer side into the (Continued)

Figure 1:
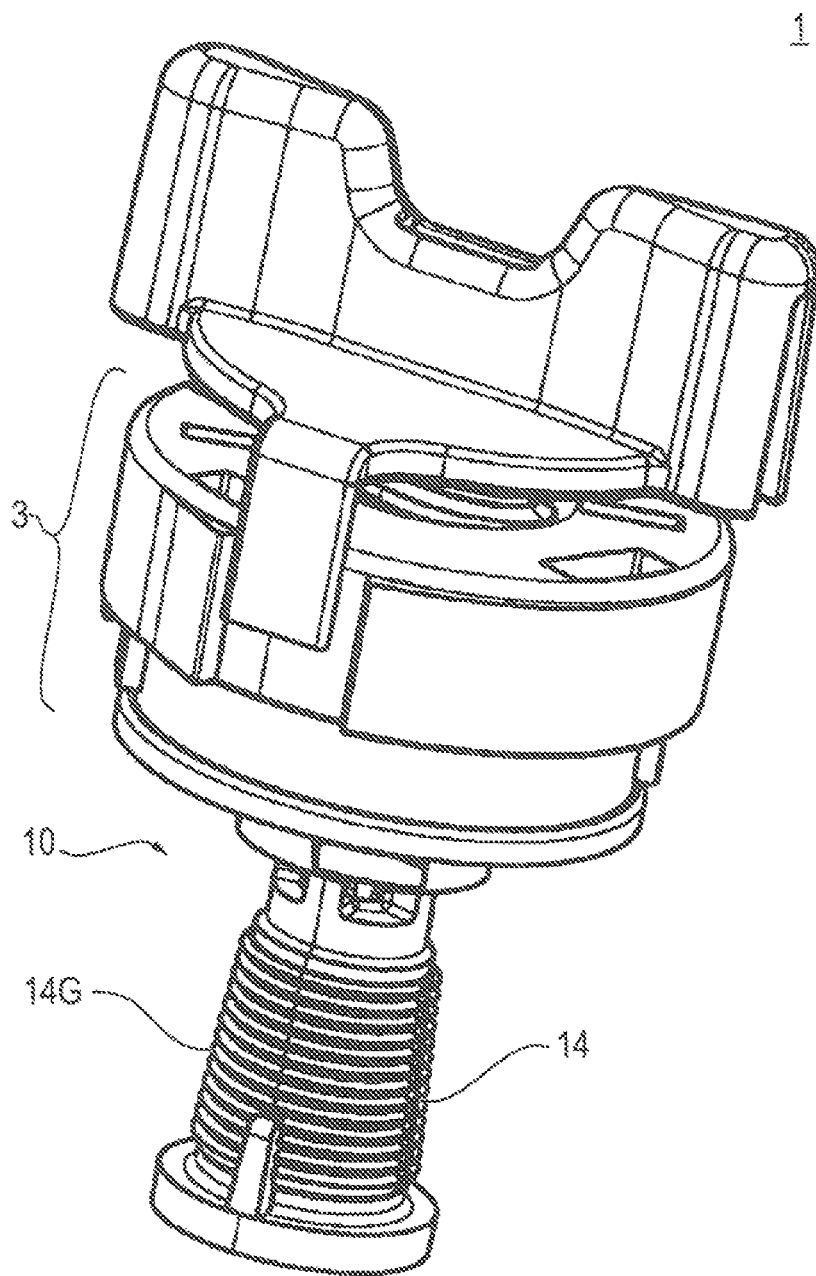

pretension thread of the pretension element having an inner thread at its radial inner side into which the fastening thread of the fastening bolt is screwable. At least a constructive rotation protection is provided between the hollow cylindrical thread element and the compressible pretension element. A production method for the quick fastener is further provided.

5 Claims, 7 Drawing Sheets

(58) Field of Classification Search
USPC ........ 411/349, 550–552, 535, 536, 114, 115, 411/432
See application file for complete search history.

(56) References Cited

U.S. PATENT DOCUMENTS

| | | | |
|---|---|---|---|
| 1,542,467 A * | 6/1925 | Moratta | F16B 31/04 285/81 |
| 4,043,239 A * | 8/1977 | DeFusco | F16B 5/0233 296/187.01 |
| 5,492,388 A | 2/1996 | Kawasaki | |
| 5,871,322 A * | 2/1999 | Nakamura | B24B 45/006 411/408 |
| 6,685,350 B2 | 2/2004 | Esser et al. | |
| 6,789,993 B2 | 9/2004 | Ozawa et al. | |
| 8,061,948 B2 | 11/2011 | DeGelis | |
| 8,066,465 B2 | 11/2011 | Figge et al. | |
| 8,202,033 B2 * | 6/2012 | Choi | B62D 25/147 411/535 |
| 8,337,132 B2 | 12/2012 | Steffenfauseweh et al. | |
| 8,657,545 B2 * | 2/2014 | Magno, Jr. | F16B 7/187 248/214 |
| 8,864,432 B2 | 10/2014 | Figge et al. | |
| 2010/0278612 A1 | 11/2010 | Steffenfauseweh et al. | |
| 2017/0314592 A1 | 11/2017 | Jodeleit et al. | |

FOREIGN PATENT DOCUMENTS

| | | |
|---|---|---|
| CN | 101135331 A | 3/2008 |
| CN | 101443561 A | 5/2009 |
| CN | 101925487 A | 12/2010 |
| CN | 102138011 A | 7/2011 |
| CN | 204591923 U | 8/2015 |
| DE | 20 2007 016 945 U1 | 6/2008 |
| DE | 10 2009 016 755 A1 | 11/2009 |
| DE | 10 2011 104 386 A1 | 12/2012 |
| JP | H09-32832 A | 2/1997 |
| JP | 2004-211753 A | 7/2004 |
| JP | 2012-041989 A | 3/2012 |
| WO | WO 2009/132755 A1 | 11/2009 |

OTHER PUBLICATIONS

International Search Report and Written Opinion for PCT/EP2015/071787; dated Dec. 4, 2015; 10 pages.
Chinese Office Action for CN 201510073910.7; dated Apr. 29, 2019; 16 pages.

* cited by examiner

QUICK FASTENER, METHOD FOR CONNECTING TWO COMPONENTS BY MEANS OF THE QUICK FASTENER AND PRODUCTION METHOD THEREFOR

CROSS REFERENCE TO RELATED APPLICATIONS

This application is a national stage application under 35 U.S.C. § 371 of International Application No. PCT/EP2015/071787, filed Sep. 22, 2015, which claims priority of German Patent Application No. 10 2014 221 266.9, filed Oct. 20, 2014, the entire contents of each application being herein incorporated by reference.

FIELD OF THE INVENTION

The present invention is related to a quick fastener by means of which at least a first component and a second component are connectable to each other. Further, the present invention is related to a connecting method for the above-mentioned components by means of the quick fastener as well as a production method for the quick fastener.

BACKGROUND OF THE INVENTION

In the prior art, different connectors are known by means of which a first and a second component are connectable to each other. While these connectors connect the first and the second component firmly to each other, they often ensure at the same time an axial tolerance compensation between both components or an axial and a lateral tolerance compensation between both components. Such a connector is for example disclosed in U.S. Pat. No. 5,492,388 and DE 20 2007 016 945 U1.

Further, the prior art discloses a quick fastener by means of which also at least a first and a second component are connectable to each other. For this purpose, the quick fastener consists of a first element which is fastened to the first component, for example a coupling, and of a second element, for example a ball head, which is connected to the second component. If the first and the second element are put together, a snap-in connection between the first and the second element results. At the same time, this snap-in connection provides a connection between the first and the second component. Such a quick fastener is described in DE 10 2009 016 755 A1.

DE 10 2011 104 386 A1 describes a turn-lock fastener for fastening add-on pieces. Here, by means of a rotational movement, the individual components of the turn-lock fastener are connected to each other. The components of the turn-lock fastener are in turn each connected to a component so that at the same time a connection between two components is produced. The retaining of the rotational connection is realized via a self-inhibiting or self-cutting thread wherein the frictional engagement of the threads is supported by the spring pretension of a sinuous spring. However, these forces are not sufficient to resist for example oscillations or vibrations in vehicles. Therefore, the produced connection often fails which results in time-intensive maintenance work.

It is therefore the object of the present invention to provide a reliable quick fastener compared to the prior art by means of which a first and a second component are connectable to each other.

SUMMARY OF THE INVENTION

The above object is solved by a quick fastener, by a connection method as well as by a production method according to the claims of this application. Exemplary embodiments of the present invention result from the following description, the accompanying drawings and the appending patent claims.

The inventive quick fastener by means of which at least a first and a second component are connectable to each other comprises the following features: a fastening bolt having a radial outer fastening thread of a first spiral direction which is fastenable at the second component, a compressible pretension element which is fastenable at the first component and which comprises a pretension thread at a radial inner side having a second spiral direction opposite to the first spiral direction, a hollow cylindrical thread element having a drive means which is screwable into the pretension thread of the pretension element with an outer thread at a radial outer side and which has an inner thread at a radial inner side into which the fastening thread of the fastening bolt is screwable, wherein at least a constructive rotation protection is provided between the hollow cylindrical thread element and the compressible pretension element. Further, the present invention comprises the above described quick fastener at which the fastening bolt is already connected to the second component.

The first and the second component are connected to each other in that the fastening bolt is screwed to the compressible pretension element in combination with an axially acting mechanical pretension. To this end, the compressible pretension element comprises a hollow cylindrical thread element into which the fastening bolt is screwable. One turn of the hollow cylindrical thread element by a defined rotation angle compared to the compressible pretension element ensures a reliable connection between the first and the second component. For maintaining this connection permanently and reliably, a constructive rotation protection is provided between the hollow cylindrical thread element and the compressible pretension element. It is further preferred to use such or an additional rotation protection between the thread element and the pretension element as turn-back protection during the fastening method for the first component at the second component. According to a further embodiment of the present invention, a rotation protection between the thread element and the pretension element is provided which prevents a locking or a screwing-in of the thread element into the pretension element which is too tight. In this context, the term constructive rotation protection means that at the components moving relatively to each other, i.e. at the hollow cylindrical thread element and the compressible pretension element, geometrical configurations are provided, the cooperation of which provides a rotation protection. From this it follows that here not a rotation protection solely based on a friction condition in a self-locking or self-cutting thread is meant.

According to a preferred embodiment of the present invention, the quick fastener comprises a releasable lock between the pretension element and the hollow cylindrical thread element by means of which a fastening condition between the first and the second component is ensurable. From this it follows that the constructive rotation protection maintains the final connection condition between the first and the second component. To this end, preferably the pretension element comprises a radially outside arranged indentation into which an axially extending locking arm of the hollow cylindrical thread element is lockable. On the one hand, this lock ensures that the produced connection is not released by vibrations and other environmental influences. Further, preferably the lock provided ensures also that the quick fastener is not overturned during the creation of the connection between the first and the second component. Because the lock ensures at the same time a rotation protection in rotating fastening direction of the hollow cylindrical thread element. In this manner it is ensured that the components to be connected to each other are not mechanically overused.

According to a further preferred embodiment of the present invention, the pretension element comprises a radially outside arranged elevation by means of which a releasable frictional connection between the axially extending locking arm of the hollow cylindrical thread element is producible. The axially extending locking arm of the hollow cylindrical thread element is arranged preferably radially adjacent to an outer side of the pretension element. During the rotation of the cylindrical thread element, the locking arm moves with respect to the radial outer surface of the pretension element. By means of a radial elevation at the radial outer side of the pretension element, an obstacle is moved into the way of the locking arm which is overcomeable during the rotation movement only by means of a higher torque. In case after overcoming the radially outside arranged elevation the thread element is released for example by a technician or by a tool, the frictional engagement between locking arm and elevation provides a frictional connection which prevents a turning back of the hollow cylindrical thread element opposite to the installation rotation direction. Therefore, this type of constructive rotation protection provides an intermediate turn-back protection with respect to the relative rotation position between hollow cylindrical thread element and pretension element.

According to a further preferred embodiment of the present invention, the pretension element comprises a releasable lock connection at the front side adjacent to the hollow cylindrical thread element by means of which a relative rotation in a rotation direction between pretension element and thread element is blocked and by means of which a relative rotation between pretension element and thread element in an opposite rotation direction is prevented or hindered.

According to the invention it is preferred that the quick fastener also comprises a constructive rotation protection to prevent a locking of the hollow cylindrical thread element with the pretension element. Such a locking would lead to that the hollow cylindrical thread element cannot be released from the pretension element anymore so that also no connection between the first and the second component would be producible. Such a rotation protection is producible in an initial or transport position of the quick fastener by means of the axially extending locking arm (see above) and a respective recess or locking groove at the radial outer edge of the pretension element. According to the invention, it is also preferred to provide a hidden constructive rotation protection. For this purpose, a locking connection is arranged between the oppositely to each other arranged front sides of pretension element and thread element. This releasable lock connection or constructive rotation protection is preferably formed by the combination of a protrusion or a rib having a locking groove which is arranged at the oppositely to each other arranged front sides, respectively. Depending on the shape of the protrusion, the lock is not releasable opposite to the installation rotation direction of the quick fastener while it is releasable in installation rotation direction. In this way, a screwing-in of the hollow cylindrical thread element into the pretension element which is too tight or not releasable is prevented.

According to a further preferred embodiment of the present invention, the thread element comprises a securing disk as loss protection.

The present invention discloses also a connection method for at least a first and a second component by means of a quick fastener, especially a quick fastener as it was described above. The inventive connection method comprises the following steps: providing the second component with a fastening bolt having a radial outer fastening thread of a first spiral direction, providing the first component having a through opening and fastening a compressible pretension element at the first component, wherein the pretension element comprises a pretension thread at a radially inner side having a second spiral direction opposite to the first spiral direction, screwing in of the fastening bolt into a hollow cylindrical thread element, wherein the hollow cylindrical thread element fastens the second component at the first component rotatingly by means of a drive means and locks the hollow cylindrical thread element at the pretension element by means of a rotation protection.

According to the invention, the connection method is preferably characterized by the usage of a constructive rotation protection between the pretension element and the hollow cylindrical thread element. After a connection between the first and the second component by means of the quick fastener has been produced, the constructive rotation protection ensures the maintenance and the reliability of the produced connection. For this purpose, a constructive lock between the pretension element and the hollow cylindrical thread element is used which maintains the achieved fastening condition of the quick fastener.

According to the invention, an axially extending locking arm of the hollow cylindrical thread element preferably locks for this purpose into a radial indentation of the pretension element which is arranged radially outwardly. It is also preferred to move the axially extending locking arm of the hollow cylindrical thread element beyond a radial elevation of the pretension element which is arranged radially outside so that the locking arm and the elevation provide a turn-back protection for the thread element. This turn-back protection prevents a turning back of the thread element against the installation rotation direction of the hollow cylindrical thread element.

The present invention further comprises a production method for the above described quick fastener having the following steps: providing a compressible pretension element which is fastenable at the first component and which comprises a pretension thread at a radial inner side having a second spiral direction opposite to the first spiral direction, producing a hollow cylindrical thread element having a drive means which is screwable into the pretension thread of the pretension element with an outer thread at a radial outer side and which comprises an inner thread at a radial inner side into which the fastening thread of the fastening bolt is screwable, connecting the compressible pretension element to the hollow cylindrical thread element and providing a constructive rotation protection between the hollow cylindrical thread element and the compressible pretension element.

Further preferred, the pretension element is provided in a further step with an indentation which is arranged radially outside and the hollow cylindrical thread element is provided with an axially extending locking arm so that they are lockable. According to a further preferred embodiment, the pretension element is provided with an elevation which is arranged radially outside and by means of which a releasable frictional connection between an axially extending locking arm of the hollow cylindrical thread element is producible. It is also preferred to provide a releasable lock connection at the pretension element at the front side adjacent to the hollow cylindrical thread element by means of which a relative rotation between pretension element and thread element in a rotation direction is blocked and by means of which a relative rotation between pretension element and thread element in an opposite rotation direction is prevented or hindered.

SHORT DESCRIPTION OF THE ACCOMPANYING DRAWINGS

Figure 2:
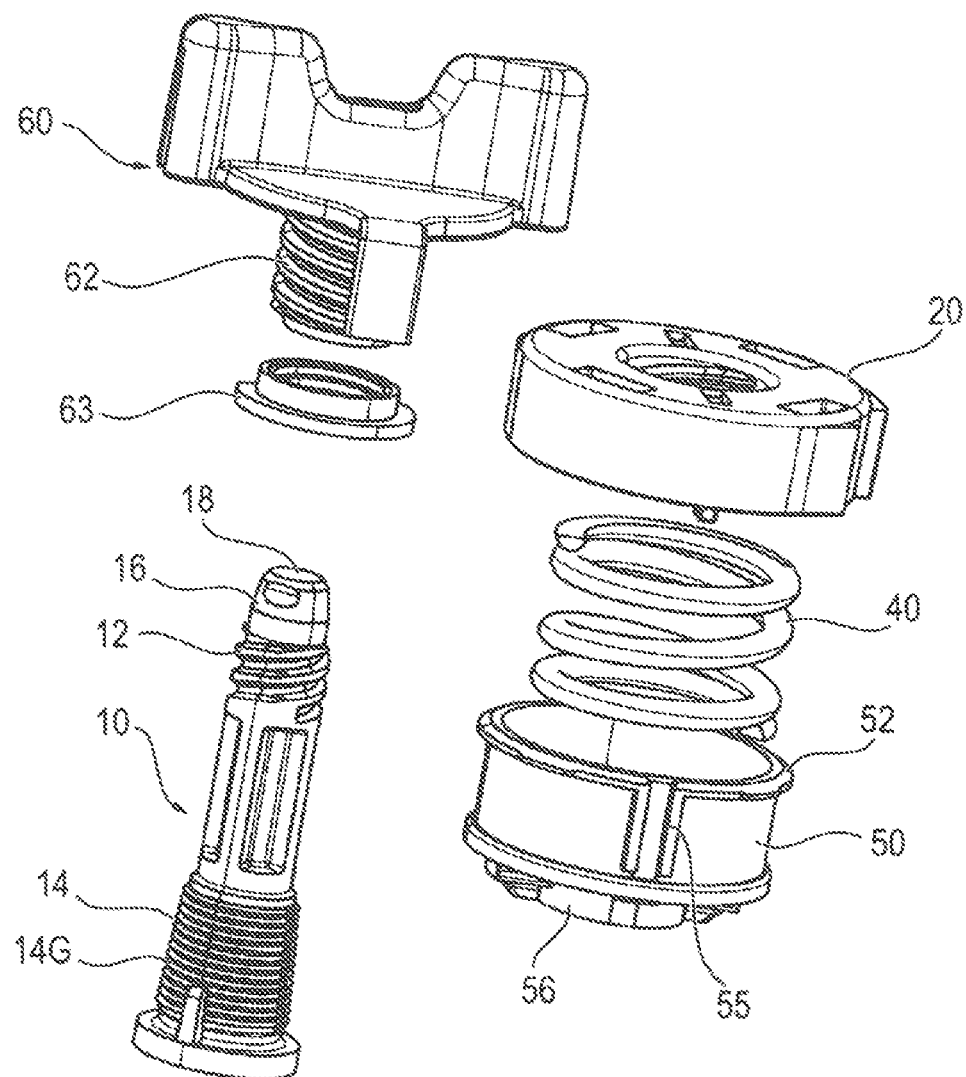
Figure 3:
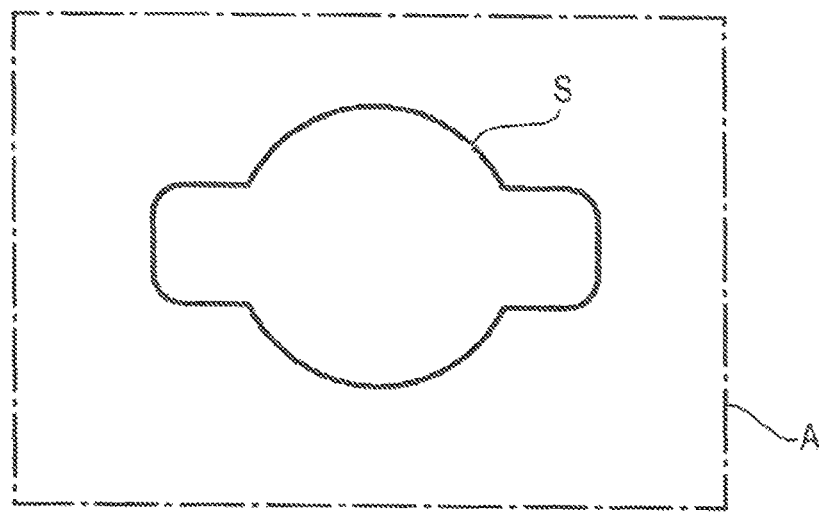
Figure 4:
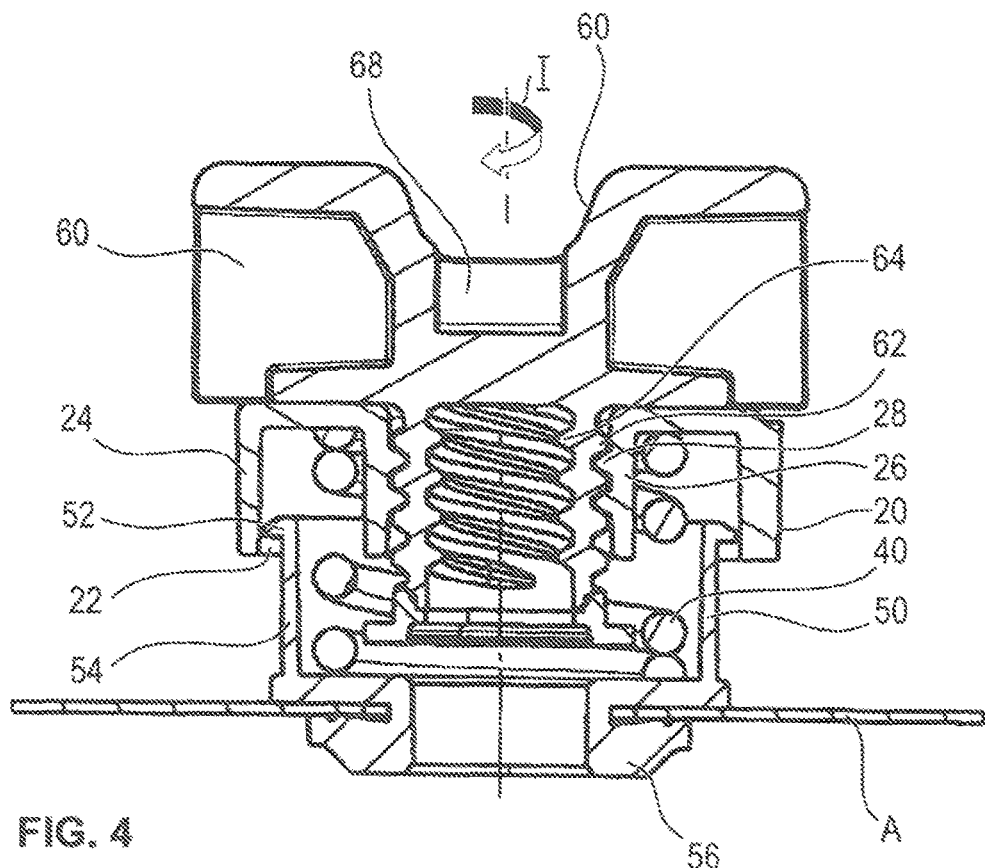
Figure 5:
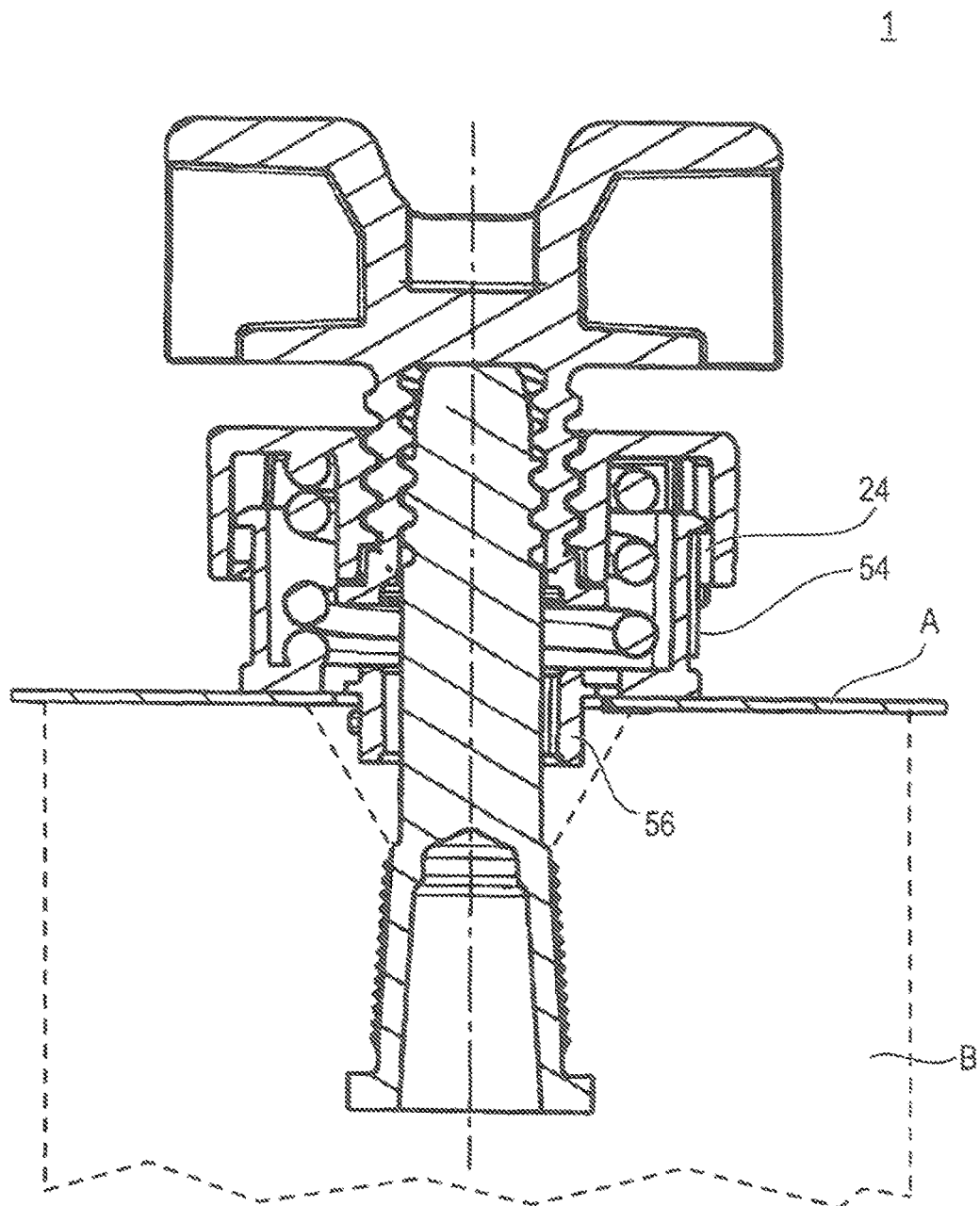
Figure 6:
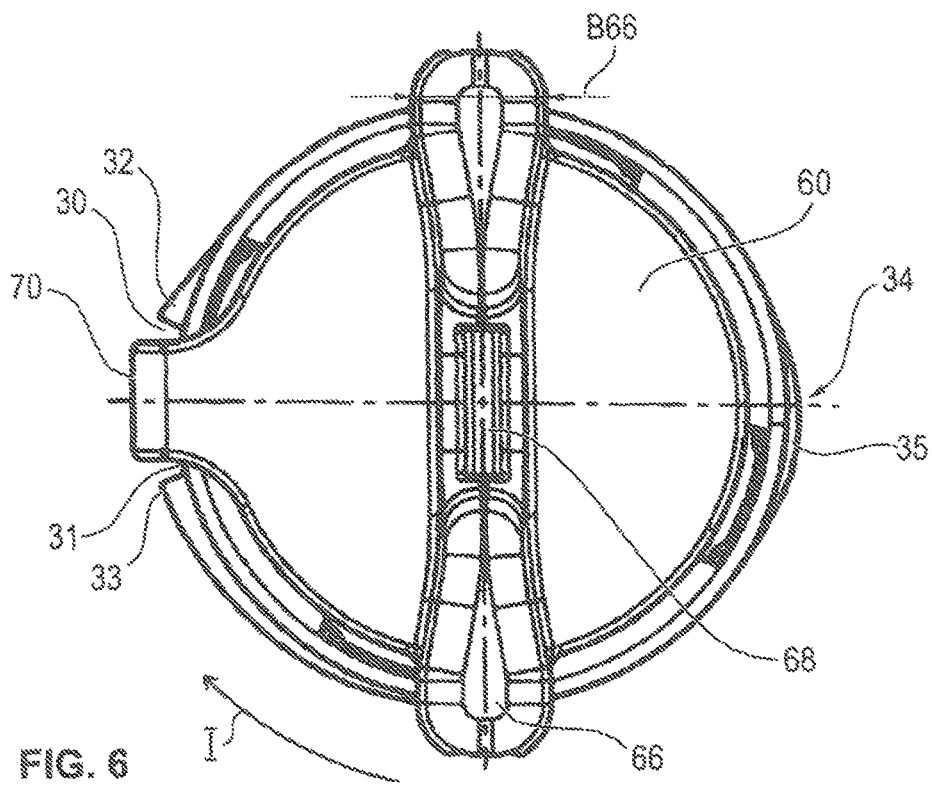
Figure 7:
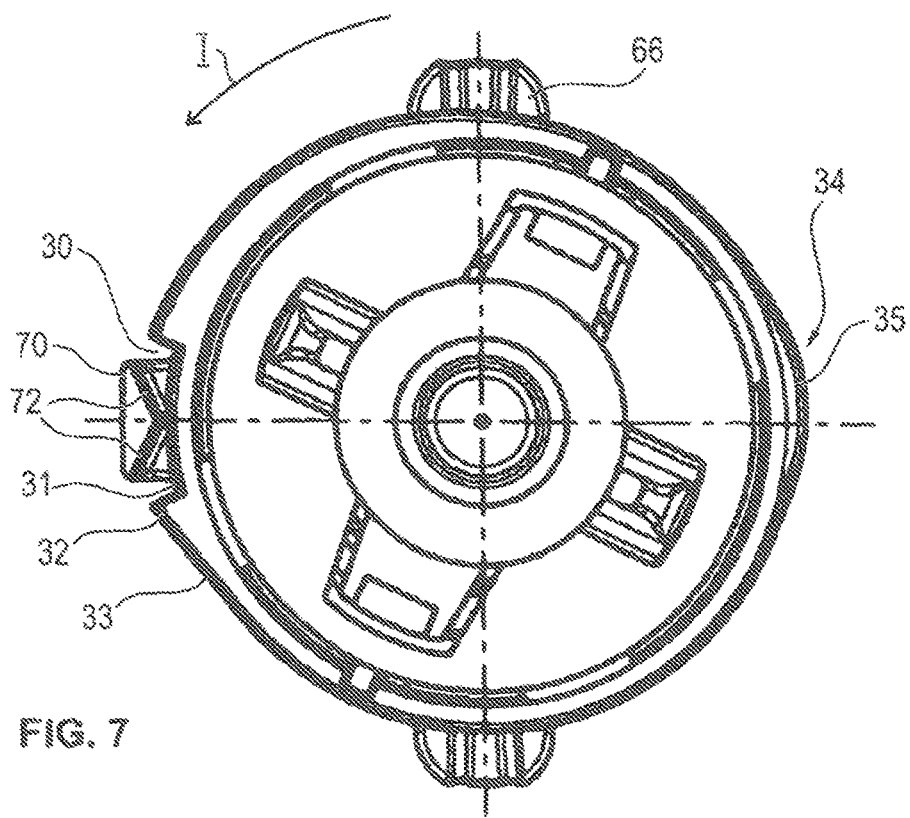
Figure 8:
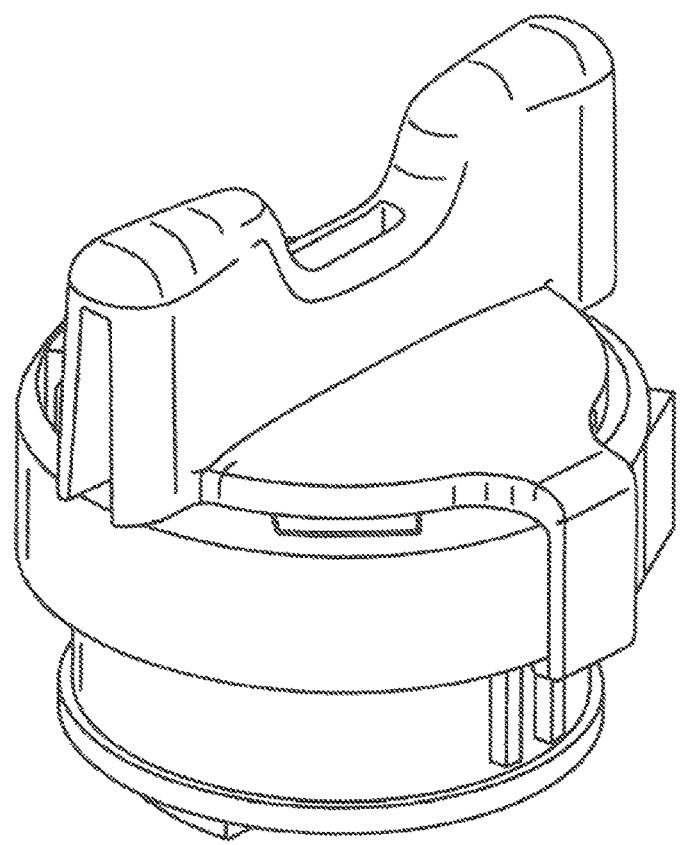
Figure 9:
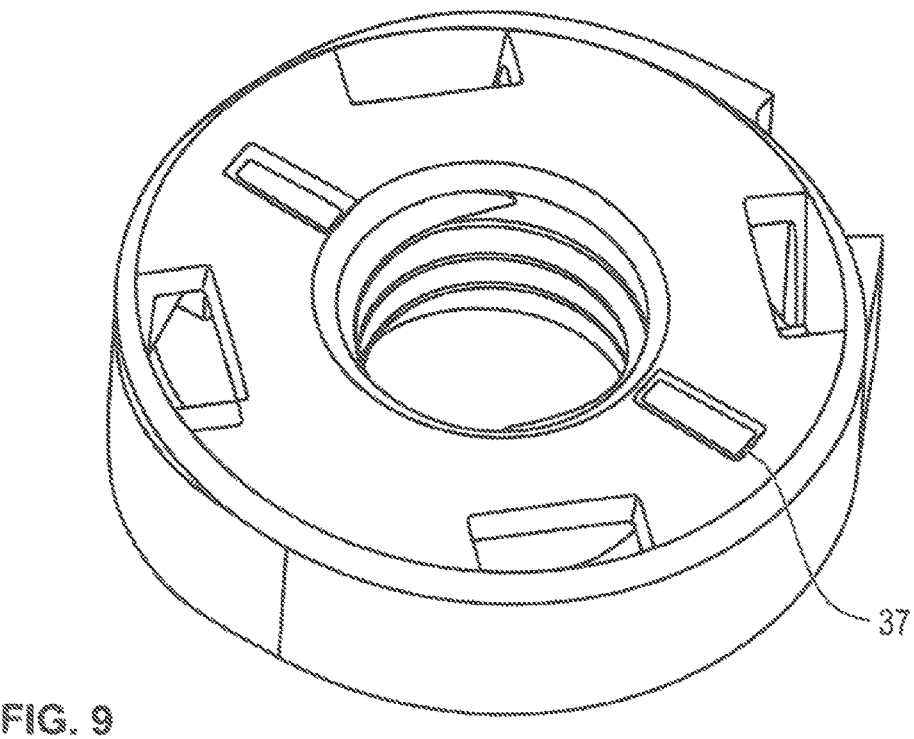
Figure 10:
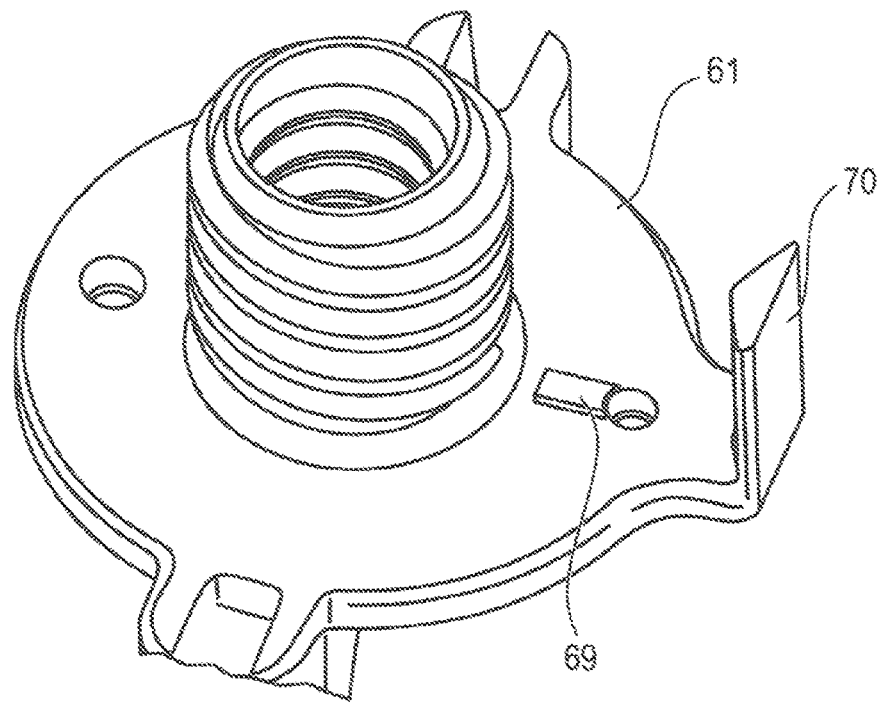
Figure 11:
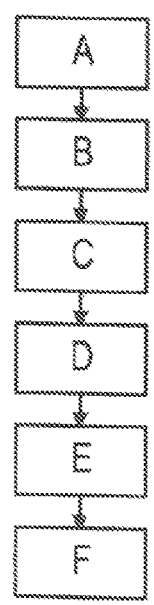

The present invention is now described in detail with respect to the accompanying drawings. They show:

FIG. 1 depicts a first preferred embodiment of the inventive quick fastener,

FIG. 2 is an exploded view of the embodiment of the quick fastener according to FIG. 1, FIG. 3 is a preferred schematic view of the first component, FIG. 4 is a cross-sectional view of a preferred embodiment of the inventive quick fastener in a pre-installed position in the first component, FIG. 5 is a cross-sectional view of a preferred embodiment of the quick fastener according to FIG. 4 in a connection condition, FIG. 6 is a top view of a preferred embodiment of the hollow cylindrical thread element, FIG. 7 is an axial view of a preferred embodiment of the inventive quick fastener from the bottom, FIG. 8 is a perspective view of a preferred embodiment of the inventive quick fastener in a transport condition, FIG. 9 is a perspective view of a preferred embodiment of a part of the pretension element, FIG. 10 is a perspective view of a preferred embodiment of the hollow cylindrical thread element, and FIG. 11 is a flow chart of a preferred embodiment of the inventive connection method.

DESCRIPTION OF THE PREFERRED EMBODIMENTS

The inventive quick fastener 1 serves for fastening of at least a first component A and a second component B at each other, as it is for example shown in FIG. 5. Different preferred embodiments of the inventive quick fastener 1 are depicted in FIGS. 1 to 10. It is needless to say that the individual features of the quick fastener 1 in the respective shown and described feature combination but also separated from this feature combination are usable in the quick fastener 1. Further, features of one preferred embodiment are usable without problems in combination with any other preferred embodiment of the invention.

FIG. 1 shows a first preferred embodiment of the quick fastener 1 which is shown in an exploded view in FIG. 2. The quick fastener 1 consists of a fastening bolt 10 having a fastening thread 12 with a first spiral direction. The fastening thread 12 is used for the connection to further components of the quick fastener 1 (see below). Further, the fastening bolt 10 comprises a connecting end 14. According to a preferred embodiment of the present invention, the connecting end 14 comprises a thread by means of which the fastening bolt 10 is fastenable or is fastened, respectively, at component B (step A). In the same way, it is also preferred to form the connecting end 14 of the fastening bolt as bayonet lock, as a snap lock or as a glue end for forming an adhesive connection to the component B. According to FIG. 2, the connecting end 14 comprises a ribbed fastening portion which conically tapers in the direction of the fastening thread. This connecting end 14 is fastened in an opening of the component B by means of a press fit. In case the fastening bolt 10 rotates, the connection to the component is not affected by this. Also preferably, the fastening bolt 10 comprises a leading end 16 having a stop surface 18. The leading end 16 is screwed with the fastening thread 12 into the combination of a compressible pretension element 3 and a hollow cylindrical thread element 60 (step C). Preferably, the fastening thread 12 is screwed into an inner thread 64 of the hollow cylindrical thread element 60 (see below).

According to a preferred embodiment of the present invention, the compressible pretension element 3 comprises a centrally arranged spring 40 at which a guiding element 50 and a securing element 20 are supported axially opposed to each other. According to different preferred embodiments of the present invention, the spring 40 consists of a screw or helical spring (see FIG. 2), of a plurality of disk springs (not shown) or of any other spring construction which is compressible in axial direction and has an axial through opening.

For ensuring the function of the compressible pretension element 3 consisting of the above-mentioned components 20, 40, 50, the spring 40 has preferably a spring rate $K_{40}$ in the range of 20 N/mm≤$K_{40}$≤50 N/mm, preferably 30 N/mm≤$K_{40}$≤40 N/mm and further preferred of 34 N/mm≤$K_{40}$≤38 N/mm. According to a first preferred embodiment, the helical spring comprises a spring rate $K_{40}$ of 40 N/mm. It is also preferred to provide the helical spring 40 with a spring rate $K_{40}$ of 37.5 N/mm. The spring 40 is retained in a compressed condition between the securing element 20 and the guiding element 50. The securing element 20 and the guiding element 50 are connected to each other inseparably but relatively movable. To this end, mutually opposing, radially inwardly protruding and circumferential protrusions 22, 52 form an undercut which cannot be overcome by the adjacent protrusion 52, 22, respectively. Further preferred, a radially inwardly protruding web 24 is arranged in an axially extending linear guiding 54, preferably a groove or indentation. While the web 24 is arranged at the securing element 22 and the linear guiding 54 is arranged at the guiding element 50, it is also preferred to arrange the web 24 at the guiding element 50 and the linear guiding 54 at the securing element 20. If the compressible pretension element 3 is compressed in axial direction against the force of the spring 40, the securing element 20 and the guiding element 50 are moved towards each other. While unloading the compressible pretension element 3, the securing element 20 and the guiding element are moved away from each other due to the force of the spring 40 until the protrusions 22 and 55 block a further movement. At this, the spring 40 is at least partially unloaded.

The guiding element 50 comprises a connection 56 by means of which the guiding element 50 is connectable to the first component A (step B). According to a preferred embodiment, the connection 56 is a bayonet lock with at least one, preferably two, radially outwardly protruding webs 48 and which is fastenable in a keyhole S of the first component A (see FIG. 3). It is also preferred to form the connection 56 as a thread connection or lock connection.

The guiding element 50 and the securing element 20 form a cavity in which the spring 40 is arranged. The radial outer limit of the pretension element 3 is formed by axially extending circumferential walls 24, 54 of the securing element 20 and the guiding element 50. While the securing element 20 and the guiding element 50 comprise a central axial through opening, the through opening of the securing element 20 is formed by a flange 26 protruding axially inwardly into the securing element 20.

The flange 26 comprises a thread 28 with a second spiral direction at its radial inner side. The second spiral direction of the thread 28 is opposite to the first spiral direction of the fastening thread of the fastening bolt 10. The thread 28 is preferably formed as standard thread wherein also inhibiting or locking threads are usable.

A hollow cylindrical thread element 60 is arranged within the flange. The thread element 60 comprises a radially outside arranged outer thread 62 and an inner thread 64 arranged at a radially inner side. The fastening thread 12 of the fastening bolt 10 is screwed into the inner thread 56 of the hollow cylindrical thread element 60. Therefore, the inner thread 56 has the same spiral direction as the fastening thread 12.

The outer thread 62 of the hollow cylindrical thread element 60 cooperates with the thread 28 at the radial inner side of the flange 26 of the securing element 20. Therefore, the outer thread 62 comprises the opposite spiral direction compared to the inner thread 64. To prevent a turning-back of the outer thread 62 from the thread 28, the hollow cylindrical thread element 60 comprises a securing disk 63. The securing disk 63 is preferably fastened to an end of the thread 62 by means of ultrasonic welding and extends radially beyond the thread 62.

After the fastening bolt 10 was connected to the component B and the compressible pretension element 3 was connected to the component A via the connection 56, the fastening bolt 10 and the compressible pretension element 3 are connected to each other by means of the hollow cylindrical thread element 60. At first, the quick fastener 1 is in a starting position without fastening bolt 10, as it is exemplarily shown in FIG. 4. According to a first preferred method alternative, the fastening thread 12 is screwed into the inner thread 64. Preferably, the inner thread 64 is arranged in a blind hole. Therefore, and according to an embodiment of the present connection method, the fastening bolt 10 is screwed so far into the hollow cylindrical thread element 60 that the stop surface 18 abuts at the bottom of the blind hole. Subsequently, the thread element 60 is turned via a drive means 66, here preferably a wing arrangement, in installation direction I. As the installation direction I is opposite to the spiral direction of the thread 28 and the outer thread 62, the thread element 60 is screwed out of the flange 26 of the securing element 20 when the hollow cylindrical thread element 60 is turned in installation direction I. As the hollow cylindrical thread element 60 is in its axial position firm or only slightly displaceable from the component A, the turning of the hollow cylindrical thread element 60 in installation direction I displaces the securing element 20 in direction of the component A (cf. FIGS. 4 and 5). As a result, the securing element 20 moves in axial direction to the guiding element 50, whereby the spring 40 is compressed. The compressed spring 40 (see FIG. 5) produces a pressure force and thus a frictional force between the flanks of the fastening thread 12 and the inner thread 64 as well as of the outer thread 62 and the thread 28. As the produced pressure force is larger than the pressure force of a sinuous spring, for example, an unintended turning between the hollow cylindrical thread element 60 and the securing element 20 and/or the fastening bolt 10 is prevented or preferably hindered.

According to a further preferred alternative method in an initial or starting positon of the fastening bolt 10 according to FIG. 4, the fastening bolt 10 is put into the central opening of the guiding element 50. In this positon, the fastening thread 12 and the inner thread 64 are adjacent to each other and thus are prepared for engagement. As soon as the fastening bolt 10 and the hollow cylindrical thread element 60 are turned relatively to each other in the spiral direction of the fastening thread 12 and the inner thread 64, the fastening bolt 10 is screwed into the inner thread 64 and the hollow cylindrical thread element 60 is screwed out of the thread 28 of the flange 26 of the securing element 20. In this way, the components A and B are being moved to each other in order to be fastened. Further, by means of the turning of the hollow cylindrical thread element 60, the spring 40 is compressed between the securing element 20 and the guiding element 50. The spring force produced thereby is transferred to the components A, B so that they are pretensioned against each other. The higher spring pretension compared to for example a sinuous spring, preferably with the above-mentioned spring rate of the spring 40, produces higher pressure forces between the flanks of the threads and thus a larger limiting friction in these portions. This limiting friction counteracts a loosening of the quick fastener 1 by rotation.

Preferably, the fastening thread 12, the inner thread 64, the thread 28 and the outer thread 62 have a thread pitch of 2.5 to 4.5 mm per turn, preferably 3 to 4 mm and further preferred of 3.5 mm. By means of this thread pitch, it is ensured that the technician has to turn the hollow cylindrical thread element 60 manually or automatically only by a rotation angle $\gamma$ in the range of $90°\leq\gamma\leq720°$, preferably $90°\leq\gamma\leq360°$ and further preferred $90°\leq\gamma\leq320°$ to fasten the components A, B at each other.

For connecting the two components A, B by means of the quick fastener 1, the hollow cylindrical thread element 60 is turned by means of the drive means 66, 68. Preferably, the hollow cylindrical thread element 60 comprises a manually operable drive means 66, preferably in the shape of a wing construction (see FIG. 4, 5, 6, 8). The oppositely arranged and in radial direction orientated wings 66 extend preferably radially beyond the outer edge of the securing element 20. Due to this longitudinal extension, a sufficiently long torque arm is provided by the wings 66 to be able to turn the hollow cylindrical thread element 60 in an easier way.

According to a further preferred embodiment of the manual drive means 66, it is designed ergonomically as indicated schematically in FIG. 6. The wings 66 taper radially inwardly in their extension and comprise in the radial outer end portion the largest width $B_{66}$ transversely to the longitudinal extension. Further preferred, the wings 66 are formed curvilinear in their course, similar to a club or lobe. Due to this shaping, the shape of the wing 66 adapts to the hand of the technician and facilitates a manual turning of the hollow cylindrical thread element 60.

Further preferred, the hollow cylindrical thread element 60 comprises a mechanical drive means 68 so that the hollow cylindrical thread element 60 is rotatable by a tool. In the exemplary FIGS. 4, 6 and 8, the drive means 68 is designed as slot for a slot screw driver. Here, in the same way, an opening with a square, hexagon, Torx profile or similar is conceivable. In the same way, an axial protrusion is usable which has an outer profile in the shape of a square, a hexagon, a Torx or similar.

The inventive securing element 20 comprises further at least a constructive rotation protection 30; 34; 36. The constructive rotation protection 30; 34; 36 consists of cooperating geometric components so that the rotation protection is provided not only by limiting friction of surfaces which abut each other.

A first rotation protection 30 preferably consists of a circumferentially arranged engagement field or an engagement indentation 31 into which an axially extending locking arm 70 engages. The axial locking arm 70 is connected to the hollow cylindrical thread 60 so that it follows its rotation. For this purpose, it is preferred to use an areal or planar intermediate element 61 which is arranged between the drive means 66 and the threads 62, 64. The areal intermediate element 61 has preferably a round shape, wherein also other shapings fulfil the same purpose. According to a further alternative (not shown), the locking arm 70 in the shape of an angled web engages directly at the drive means 66; 68 without using an areal intermediate element 61.

As soon as the technician has turned the hollow cylindrical thread element 60 manually or mechanically into a fastening position for the components A, B, the locking arm 70 comes into engagement with the engagement indentation 31 (step F). According to a preferred embodiment of the present invention, the engagement area 31 extends over a width in circumferential direction which extends beyond the circumferential width of the locking arm 70. In this way, it is ensured that the locking arm 70 may have a variable position with limits within the engagement field 31 for fastening the components A, B at each other. Preferably, the engagement field 31 has a circumferential width in the range of 2 to 0.5 times, preferably 1.75 to 1 times, the circumferential width of the locking arm 70.

The limits of the engagement field 31 are preferably formed by webs 32 which protrude radially, which are arranged at both sides and which may only be overcome by means of a loosening torque of the locking arm 70. Preferably, the engagement field 31 passes over into the web 32 with an angle α in the range of 90 to 120°. Further preferred, at least one of the webs 32 passes in an inclined ramp plane 33 into the radial outer circumferential wall 24 of the securing element 20. In this way it is ensured that at least during rotation of the hollow cylindrical thread element 30 in installation direction I, the axial locking arm 70 slides over the ramp plane 33 and engages with or snaps into the engagement field 31.

The engagement of the locking arm 70 with the engagement field 31 is noticeable for the technician during the fastening method. Even when using a tool for fastening the two components A, B, the tool recognizes an increase of the torque which is caused by the blocking of the movement of the locking arm 70 at the webs 32. Thus, the engagement of the locking arm 70 into the engagement field 31 signalizes the achievement of an advantageous fastening position of the quick fastener 1. Further, the locking arm 70 forms a form-fit and/or non-positive connection with the engagement field 31 which prevents a loosening of the connection A, B.

Nevertheless, preferably the quick fastener 1 and thus the connection between the components A, B may be released by applying a loosening torque onto the hollow cylindrical thread element 60 opposite to the installation direction I. For supporting this loosening and preventing a destruction of the locking arm 70, the locking arm 70 is provided in cross-section with radially inwardly protruding bevelings 72. The bevelings 72 contact each other in a peak and enclose an angle in the range of 170° to 100°, preferably 150° to 100° and at most preferred an angle of 120°. It is further preferred to provide the locking arm 70 without bevelings 72.

If the locking arm is not in engagement with the engagement field 31, its radial inner side slides along the radial outer side of the circumferential wall 24. As the technician has to re-grasp at least one time, especially during the manual fastening of the components A, B at each other, the drive means 66 is not held by the technician in this re-grasping position. Therefore, the danger exists that the hollow cylindrical thread element 60 turns back opposite to the installation direction I and thereby loosens the quick fastener 1. For avoiding this and for facilitating the installation of the quick fastener 1, preferably a further rotation protection 34 is arranged in a transfer portion between a starting or transport position and the fastening position. Preferably, the rotation protection 34 is spaced in a rotation angle from the fastening position in the range of 160° to 200°, further preferred 170° to 190°. The rotation angle is measured between the middle of the engagement field 31 and the vertex of an elevation 34 (see below).

The further rotation protection 34 is formed by the elevation 35 which protrudes radially from the circumferential wall 24 and which cooperates with the locking arm 70. This elevation 35 may consist of a sinuous shape or an axial web. If the hollow cylindrical thread element 60 is turned in installation direction I, the locking arm 70 slides over the elevation 34 which is noticeable by a temporary increase of the screw-in torque. After the elevation 35 has been overcome (step E), the technician re-grasps the manual drive means 66 for continuing the rotation. Even if a turn-back torque may act on the hollow cylindrical thread element 60 during the re-grasping, this turning back against the installation direction I is blocked by the further rotation protection 34 at the elevation 35 in combination with the locking arm 70. For this purpose, the elevation 35 is formed in radial direction with such a height that it may be overcome during screwing-in in installation direction I by the locking arm 70 but creates a sufficiently high torque which blocks the rotation during an uncontrolled turning back of the hollow cylindrical thread element 60.

Further preferred, the quick fastener 1 comprises an additional rotation protection 36 which prevents a locking between the securing element 20 and the hollow cylindrical thread element 60. Also preferred, this additional rotation protection 36 is a transport protection for the quick fastener 1. From this it follows that during connecting of the components A, B, the technician preferably loosens the transport protection first (step D).

The additional rotation protection 36 is formed by an indentation 37 at the axial front side of the securing element 20 and by a rib 69 protruding in axial direction from the lower side of the intermediate element 61. It is also preferred to arrange the indentation 36 at the intermediate element 61 and the rib 69 at the securing element 20. Preferably, the rib 69 is arranged near the circumferential position of the locking arm 70.

As soon as the hollow cylindrical thread element 60 has reached the starting or transport position, the rib 69 engages in the indentation 36. Thereby, the hollow cylindrical thread element 60 is fastened releasably at the securing element 20. For preventing an overturning of the starting position against the installation direction I, the rib 69 comprises preferably a blocking surface perpendicular to the installation direction I. For facilitating a loosening of the additional rotation protection 36 in installation direction I, preferably a respective ramp beveling is provided at the rib 69. It is clear that instead of the rib 69 the indentation 37 may comprise the respective designs or shapes.

PARTS LIST FOR FIGS. 1-11

A, B component
1 quick fastener 3 compressible pretension element
10 fastening bolt
12 fastening thread having a first spiral direction
14 connecting end
14G thread
16 leading end
18 stop surface
20 securing element
22 radially circumferential protrusion
24 circumferential wall
26 flange
28 thread having a second spiral direction
30; 34; 36 rotation protection
31 engagement field
32 web
33 ramp beveling
35 elevation
37 indentation
40 spring, helical spring
50 guiding element
52 radially circumferential protrusion
54 circumferential wall
55 linear guiding
56 connection
58 central opening
60 hollow cylindrical thread element
61 intermediate element
62 outer thread
63 securing disk
64 inner thread
66 manual drive means
68 mechanical drive means
69 rib
70 locking arm
$K_{40}$ spring constant
S key hole
$B_{66}$ wing width It will be understood that numerous variations and modifications are possible within the ambits of the inventive concepts described herein, as provided in the following claims.

The invention claimed is:

1. A quick fastener by means of which at least a first and a second component are connectable to each other and which has the following features:
   a) a fastening bolt with a fastening thread of a first spiral direction which is fastenable at the second component,
   b) a compressible pretension element which is fastenable at the first component and which comprises a pretension thread at a radial inner side having a second spiral direction opposite to the first spiral direction, and
   c) a hollow cylindrical thread element having a drive means which is screwable with an outer thread at a radial outer side into the pretension thread of the pretension element and which comprises an inner thread at a radial inner side into which the fastening thread of the fastening bolt is screwable, wherein
   d) at least a constructive rotation protection is provided between the hollow cylindrical thread element and the compressible pretension element, wherein the constructive rotation protection is provided in at least one of the following d1, d2 or d3, in which:
      d1 the compressible pretension element has a radially outside arranged indentation into which an axially extending locking arm of the hollow cylindrical thread element is lockable,
      d2 the compressible pretension element has an elevation which is arranged radially outwardly and by means of which a releasable frictional connection between an axially extending locking arm of the hollow cylindrical thread element and the compressible pretension element is producible, and
      d3 the compressible pretension element comprises an indentation at a front side adjacently to the hollow cylindrical thread element and the hollow cylindrical thread element comprises a corresponding rib by means of which a relative rotation between the compressible pretension element and the hollow cylindrical thread element in a rotation direction is blocked and by means of which a relative rotation between the compressible pretension element and the hollow cylindrical thread element is blocked or hindered in an opposite rotation direction.

2. The quick fastener according to claim 1, wherein a securing disk is provided at the thread element as loose protection.

3. A quick fastener by means of which at least a first and a second component are connectable to each other, wherein the second component is provided with a fastening bolt having a fastening thread of a first spiral direction and which comprises the following features:
   a) a compressible pretension element which is fastenable at the first component and which comprises a pretension thread at a radial inner side having a second spiral direction opposite to the first spiral direction, and
   b) a hollow cylindrical thread element having a drive means which is screwable with an outer thread at a radial outer side into the pretension thread of the pretension element and which comprises an inner thread at a radial inner side into which the fastening thread of the fastening bolt is screwable, wherein
   c) at least a constructive rotation protection is provided between the hollow cylindrical thread element and the compressible pretension element wherein the constructive rotation protection is provided in at least one of the following c1, c2 or c3, in which:
      c1 the compressible pretension element has a radially outside arranged indentation into which an axially extending locking arm of the hollow cylindrical thread element is lockable,
      c2 the compressible pretension element has an elevation which is arranged radially outwardly and by means of which a releasable frictional connection between an axially extending locking arm of the hollow cylindrical thread element and the compressible pretension element is producible,
      c3 the compressible pretension element comprises an indentation at a front side adjacently to the hollow cylindrical thread element and the hollow cylindrical thread element comprises a corresponding rib by means of which a relative rotation between the compressible pretension element and the hollow cylindrical thread element in a rotation direction is blocked and by means of which a relative rotation between the compressible pretension element and the hollow cylindrical thread element is prevented or hindered in an opposite rotation direction.

4. The quick fastener according to claim 3, wherein a securing disk is provided at the thread element as loose protection.

5. A production method for a quick fastener by means of which at least a first and a second component are connectable to each other, wherein the second component is provided with a fastening bolt having a fastening thread of a first spiral direction, wherein the method comprises the following steps:

a) providing a compressible pretension element which is fastenable to the first component and comprises a pretension thread at a radial inner side having a second spiral direction which is opposite to the first spiral direction, b) producing a hollow cylindrical thread element with a drive means which is screwable with an outer thread at a radial outer side into the pretension thread of the pretension element and which comprises an inner thread at a radial inner side into which the fastening thread of the fastening bolt is screwable, and c) connecting the compressible pretension element with the hollow cylindrical thread element and providing a constructive rotation protection between the hollow cylindrical thread element and the compressible pretension element, wherein the constructive rotation protection is provided by at least one of the further steps of:

c1 providing the compressible pretension element with an indentation which is arranged radially outside and providing the hollow cylindrical thread element with an axially extending locking arm so that the compressible pretension element and the hollow cylindrical thread element are lockable;

c2 providing the compressible pretension element with an elevation which is arranged radially outside and by means of which a releasable frictional connection is produced between an axially extending locking arm of the hollow cylindrical thread element and the compressible pretension element, and/or c3 providing the compressible pretension element with an indentation at a front side adjacently to the hollow cylindrical thread element and providing the hollow cylindrical thread element with a corresponding rib by means of which a relative rotation between the compressible pretension element and the hollow cylindrical thread element is blocked in a rotation direction and by means of which a relative rotation between the compressible pretension element and the hollow cylindrical thread element is blocked or hindered in an opposite rotation direction.

* * * * *